Figure 1:
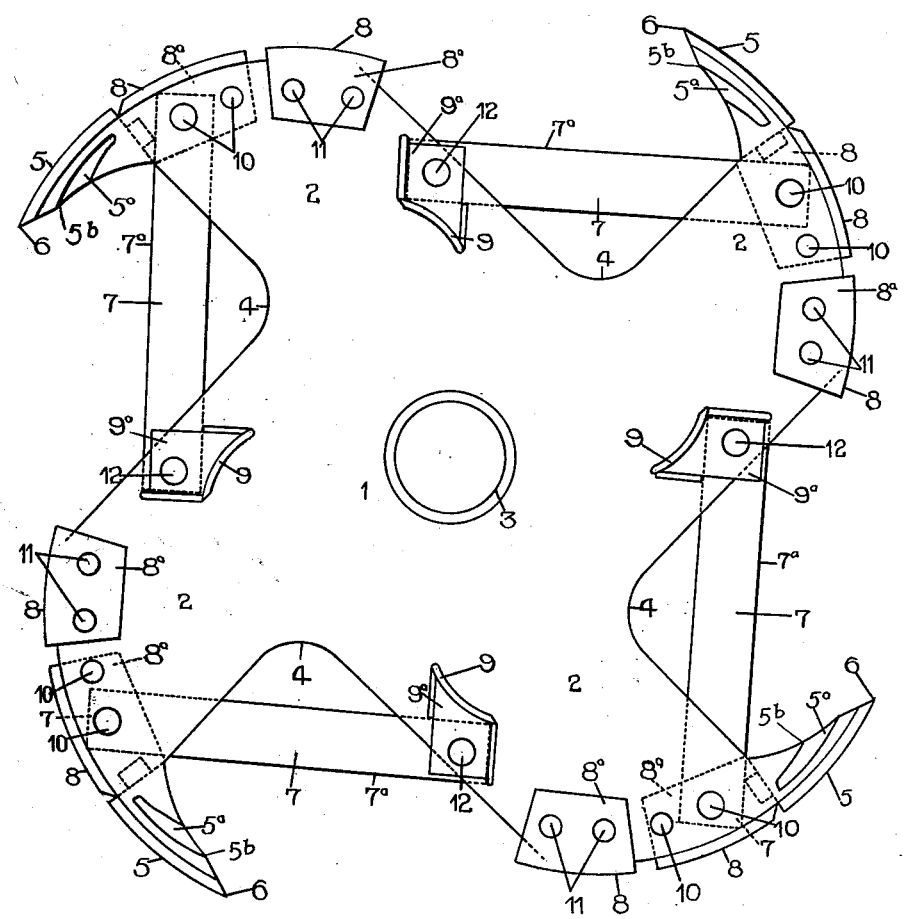

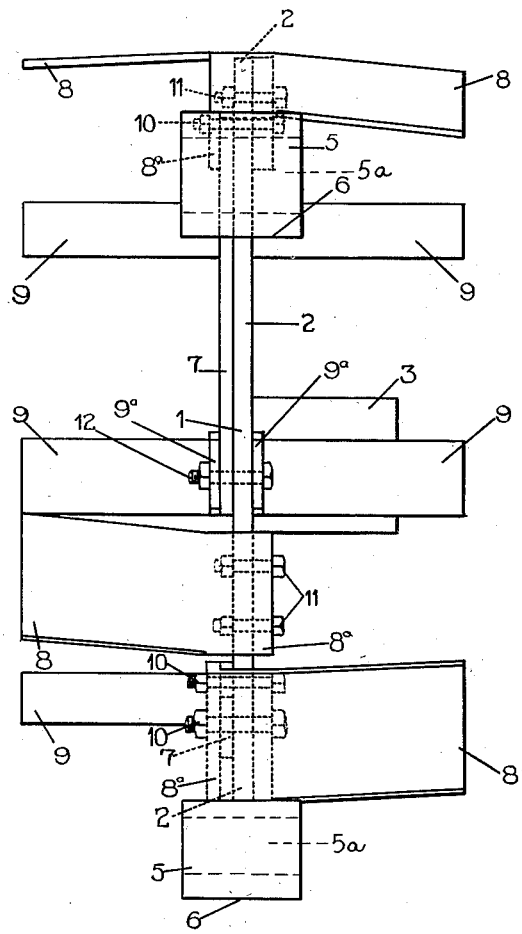
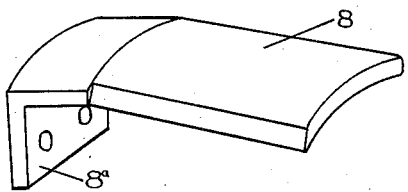
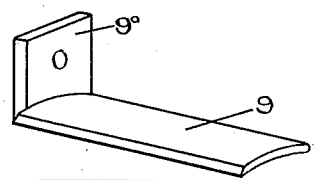
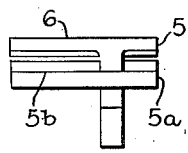

Patented Mar. 25, 1952

2,590,790

UNITED STATES PATENT OFFICE 2,590,790

ROTARY CULTIVATING TOOL

Albert Vinten Pettman, Epsom, Auckland,
New Zealand

Application July 31, 1947, Serial No. 765,061
In New Zealand April 29, 1946

Section 1, Public Law 690, August 8, 1946
Patent expires April 29, 1966

4 Claims. (Cl. 97—212)

The invention relates to rotary cultivators of the type having cutting edges on arms rotatable about a horizontal axis, the shaft on which said arms are mounted being driven through gearing either from a power unit on the implement of which the cultivators form part, or from the running wheels thereof.

It has been proposed to provide a rotary cultivator, in which the working implement comprises a cutter arm of substantially pointed formation, having disposed thereon rearwardly of the cutting edge, a transverse cutter in the form of a rectangular bar or plate, so that when the pointed blade of the arm enters the ground the transverse cutter follows to make a cross cut.

It has also been proposed to provide a rotary cultivator comprising a hub adapted for mounting on a shaft to rotate therewith, radial arms extending from the hub, leading cutting edges on said arms to make cuts in ground in the direction of rotation of the unit, and cross cutting edges which follow the leading cutting edges and make cross cuts in the ground at right angles to the first made cuts, the said cross cutting edges being provided on plates of substantially V shape, secured to the said radial arms.

The object of the invention is to provide an improved form of rotary cultivator of the aforesaid type, and which operates more efficiently, and gives better results in the cultivation of land than known forms, by progressively breaking up the soil being dealt with, the construction and assembly of the parts being such that there is no undue strain on bolts or other fastenings, unnecessary friction is avoided, and economy in the use of fuel, time and labour is effected.

A cultivator having the improvements according to the invention, incorporated therein, comprises a hub adapted for mounting on a shaft to rotate therewith; arms with curved outer ends extending from the hub; curved leading cutters fitted to the extremities of and extending from said arms to provide continuations of the curves thereof, said leading cutters being adapted to make a cut in the ground in the direction of rotation of the cultivator; blade cutters secured on said arms so as to follow the leading cutters, and make cuts in the ground in or parallel with the plane through which the cultivator rotates, and wing cutters secured on said arms at each side thereof to follow the leading and the blade cutters, and make cuts in the ground across the cuts made by said leading cutters and said blade cutters.

In order that the invention may be clearly understood, a practical form thereof is illustrated by means of the accompanying drawing, but it must be understood that the invention is not restricted to the specific form illustrated, and about to be particularly described herein.

In the drawing,

Figure 1 is a side elevation of a rotary cultivator provided with the improvements according to the invention, Figure 2 is an elevation of the cultivator at right angles to the view in Figure 1, Figure 3 is a view in perspective of one of the outer wing cutters, Figure 4 is a view in perspective of one of the inner wing cutters, and Figure 5 is a front edge view of one of the leading cutters.

The improved cultivator is provided with a hub 1 having thereon arms 2 preferably formed integral therewith, and made to incline therefrom in the direction of rotation of the cultivator, said arms having curved outer ends, and the hub 1 preferably being welded on a tubular shaft 3.

The cutters carried by each arm 2 comprise, a curved leading cutter 5 which extends forward or in the direction of rotation of the cultivator from the outer extremity of the arm 2, with the curve of which it conforms to, said cutter 5 in one form having a cross chisel shaped cutting edge 6 parallel with the axis of the cultivator, and also having a rib 5a arranged inwardly of the curved inner surface of the cutter, said rib being formed with a cutting edge 5b lying parallel with the cutting edge 6 and nearer than the latter to the center of rotation of the cultivator.

A blade cutter 7, also formed to provide an edge 7a, either curved or straight, and adapted to cut in or parallel with the plane through which the cultivator rotates, is mounted across each space 4 between the arms 2 by being bolted at its ends to said arms 2 near the extremities thereof, to follow the leading cutters 5. The blade cutters 7 can be double edged and reversible.

Other cutters on each arm 2, comprise sets of outer and inner wing cutters 8, 9, having edges formed to cut across or at right angles to the cutters 5, 5a and 7, which cut in or parallel with the plane through which the cultivator rotates.

The wing cutters 8, 9, are formed with right angle portions 8a, 9a respectively, at their inner ends, through which they can be secured by bolts on the arms 2 at each side thereof, said wing cutters 8, 9, being set so that their outer extremities are behind their inner ends in the direction of rotation of the cultivator, and they may also be secured on the arms 2 by means of interengaging portions on the cutters and the arms 2, in addition to or in lieu of the other fastenings.

The cutters 5 are each secured to the outer end of an arm 2 by bolts 10, which are also used to secure one of the set of outer wing cutters 8 to the arm 2, one of the bolts 10 also being passed through the rear end of a blade cutter 7, to secure said end to an arm 2.

The other outer wing cutter 8 of the set thereof is secured to the arm 2 by bolts 11 in a position behind the cutter secured by the bolts 10.

Both wing cutters 8 are curved crossways to conform to the curve of the outer end of the arm 2, and when fitted on the latter are flush with the outer surface of the leading cutter 5 thereon, and form a continuation of the outer curve thereof, the right angle end portions 8ª of the cutters 8 being located at the opposite sides of the arm 2, from which said cutters 8 project, so that the latter extend across the curved outer ends of the arms 2.

The inner wing cutters 9 are also curved crossways, and their right angle end portions 9ª are secured by bolts 12 to the same sides of the arms 2 as the cutters 9 project from, a single bolt 12 being used to secure a set of cutters 9 and the forward end of a blade cutter 7 to an arm 2, the wing cutters 9 of the sets thus being in alignment crossways of the cultivator. If desired, the wing cutters 8 can also be formed for securing on the arms 2, opposite each other.

In one form of rotary cultivator, provision is made for four arms 2, each fitted with a leading cutter 5 having a cross chisel shaped cutting edge 6 at its outer or forward extremity, and a cutting edge 5ª which cuts in or parallel with the plane of rotation of the cultivator, and outer and inner sets of wing cutters 8, 9.

The wing cutters 8, 9, are formed and mounted so that in neither case does the rear or following portion of a cutter follow in the same path or line of travel as the leading portion of the cutter, and also so that each cutter 8, 9, follows in a different path or line of travel to that taken or followed by the other cutter or cutters, each wing cutter, however, cutting across the vertical cut or cuts made by the leading and blade cutters, so that each set of wing cutters 8 cuts off two blocks of earth and moves them back, and each set of wing cutters 9 cuts the same portions again, but at a different level or in a different place, thereby giving progressive cutting or cultivation of the soil, and giving a broken bottom below the cultivated soil, which prevents pan formation.

The shaft 3 on which the rotary cultivator is mounted, can be driven from a transmission shaft through any suitable gearing, which shaft is itself in turn driven through chain and sprocket or any other suitable from of gearing, either from a prime mover on the implement, or from a tractor, the shaft 3 being capable of arcuate movement about the transmission shaft, and being provided with floating bearings, as by being suspended by links or other means, from the outer ends of arms on a shaft mounted over the transmission shaft.

Also mounted on the shaft over the transmission shaft are one or more arms, each of which is provided with a toothed quadrant shaped rack which meshes with a toothed pinion on a further shaft geared through a train of reduction gearing, with a bevel wheel in mesh with a bevel pinion on the spindle of a hand wheel or crank handle, and capable of being operated by the latter.

The mounting of the rotary cutters as described, is for the purpose of providing depth control means, so that by operating the racks aforesaid per medium of the hand wheel or crank handle and gearing, the rotary cutters can be set to work at any desired depth in the ground without interfering with the drive to same.

The arrangement and combination of the cutters on the arms 2, can be varied to suit the class of ground being cultivated, and in one arrangement one or more arms 2 can be fitted with pointed leading cutters 5, followed by blade cutters 7, and one or more sets of wing cutters, while other arms 2 can be fitted with leading cutters 5 having cross chisel shaped cutting edges 6, followed by blade cutters 7 and one or more sets of wing cutters, and if desired, the wing cutters 9 can be left off.

What I do claim and desire to obtain by Letters Patent of the United States of America is:

1. A rotary cultivator, comprising a hub adapted for mounting on a shaft to rotate therewith, arms having curved outer ends extending from said hub, curved leading cutters fitted to the extremities of and extending from said arms to provide continuations of the curves thereof, said leading cutters having cross chisel-shaped cutting edges parallel with the axis of the cultivator and having a second set of cutting edges located in or parallel with the plane through which the cultivator rotates, said leading cutters being adapted to make a cut in the ground in the direction of rotation of the cultivator, blade cutters secured on said arms so as to follow said leading cutters and make cuts in the ground in or parallel with the plane through which the cultivator rotates, and wing cutters secured on said arms at each side thereof to follow the leading and the blade cutters, and make cuts in the ground across the cuts made by said leading cutters and said blade cutters.

2. A rotary cultivator, as claimed in claim 1, and wherein outer wing cutters are located behind said leading cutters, said outer wing cutters being curved crossways to conform to the curve of the outer ends of said arms, and said leading cutters.

3. A rotary cultivator, as claimed in claim 2, wherein said wing cutters located behind the leading cutters, are secured across the outer ends of the arms, one cutter of the set thereof being located behind the other cutter of the set.

4. A rotary cultivator, as claimed in claim 1, wherein there are provided outer and inner wing cutters having leading and following portions, said leading and following portions being angularly spaced with respect to one another and to said other cutters and at different distances from the axis of the cultivator so that their leading portions and their following portions follow different lines of travel through the ground as the cultivator rotates therein.

ALBERT VINTEN PETTMAN.

REFERENCES CITED

The following references are of record in the file of this patent:

UNITED STATES PATENTS

| Number | Name | Date |
| --- | --- | --- |
| 1,415,663 | Lilleberg | May 9, 1922 |
| 1,754,311 | Foot | Apr. 15, 1930 |
| 2,168,733 | Dufour | Aug. 8, 1939 |
| 2,271,032 | Pettman | Jan. 27, 1942 |

FOREIGN PATENTS

| Number | Country | Date |
| --- | --- | --- |
| 437,872 | Great Britain | Nov. 6, 1935 |
| 104,608 | Australia | July 19, 1938 |